May 24, 1960  H. A. HADLEY  2,937,863
WEIGHING SCALE
Filed April 26, 1957  5 Sheets-Sheet 1
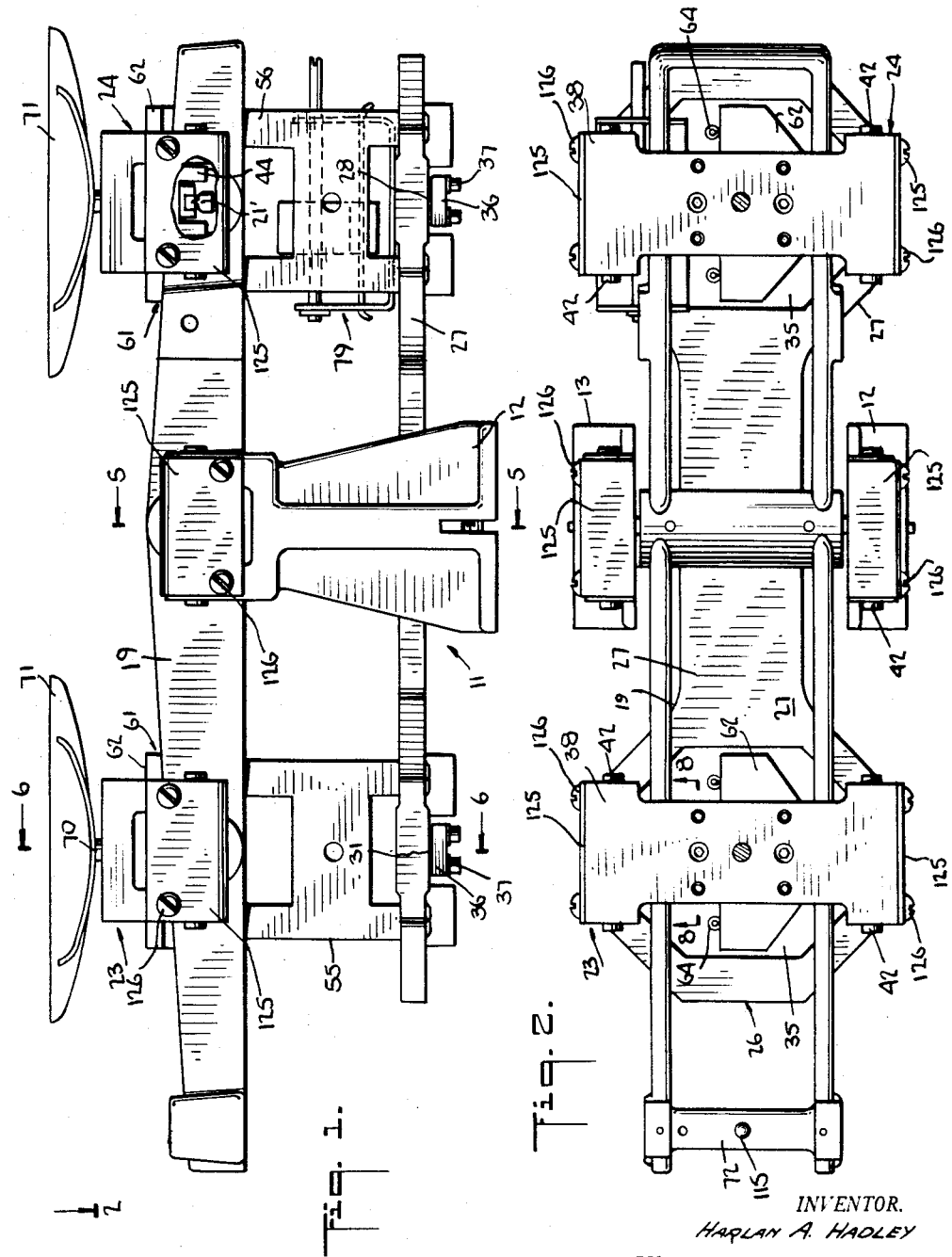
INVENTOR.
HARLAN A. HADLEY
BY
Marshall, Marshall & Geasting
ATTORNEYS

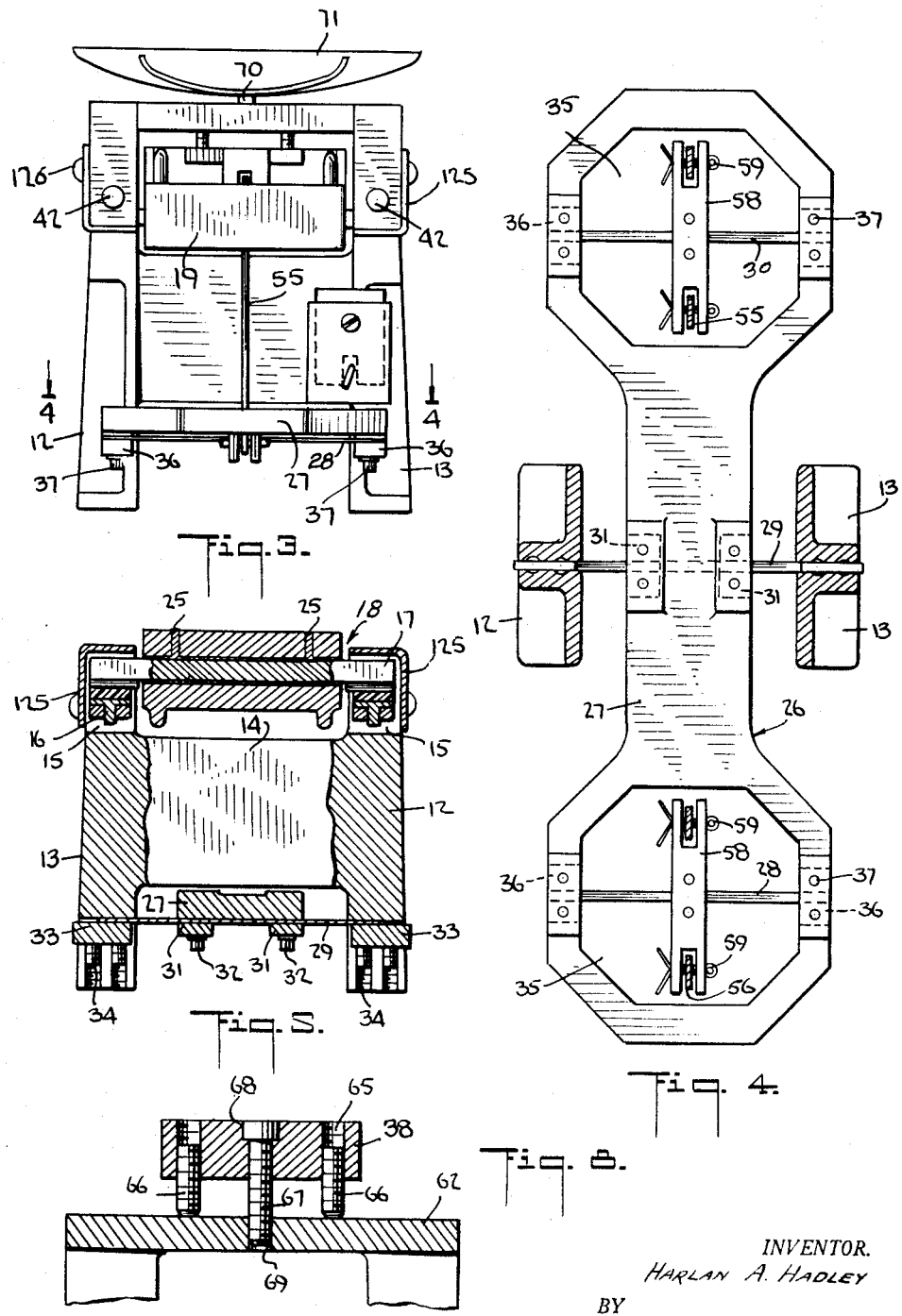

May 24, 1960  H. A. HADLEY  2,937,863
WEIGHING SCALE
Filed April 26, 1957  5 Sheets-Sheet 3
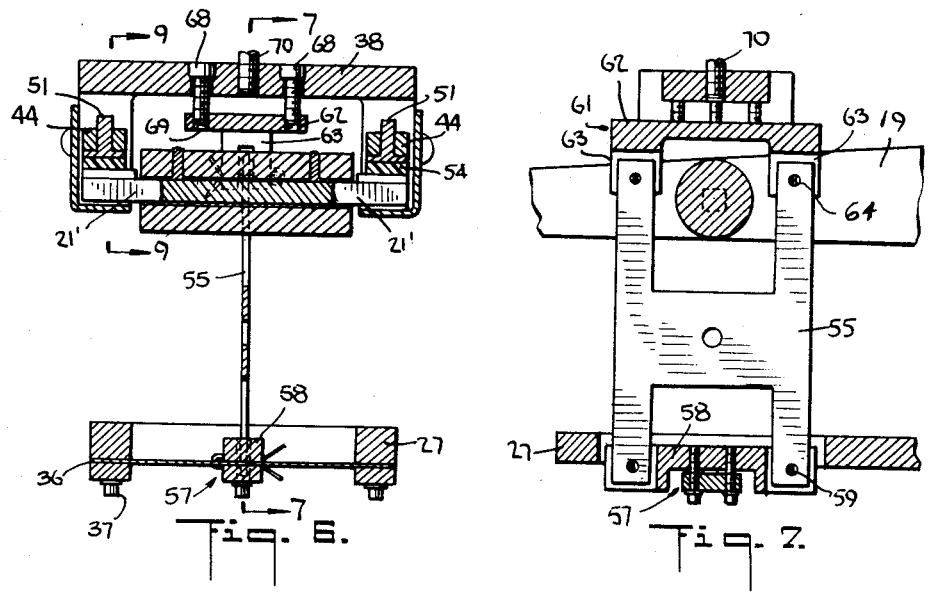
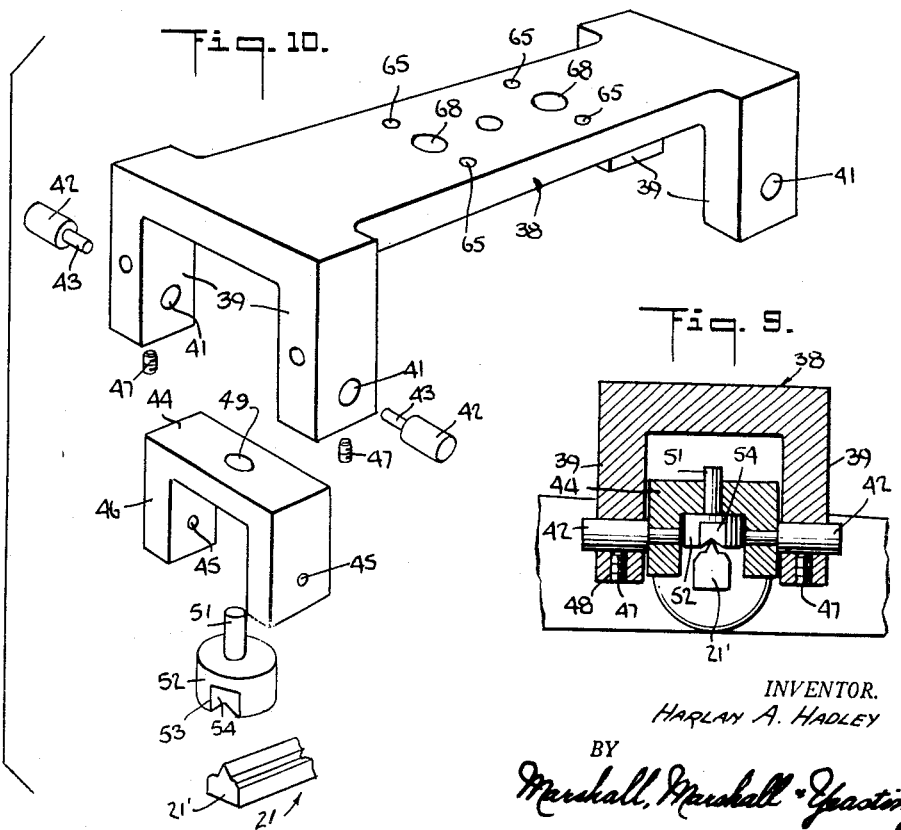
INVENTOR.
HARLAN A. HADLEY
BY
Marshall, Marshall & Heasting
ATTORNEYS

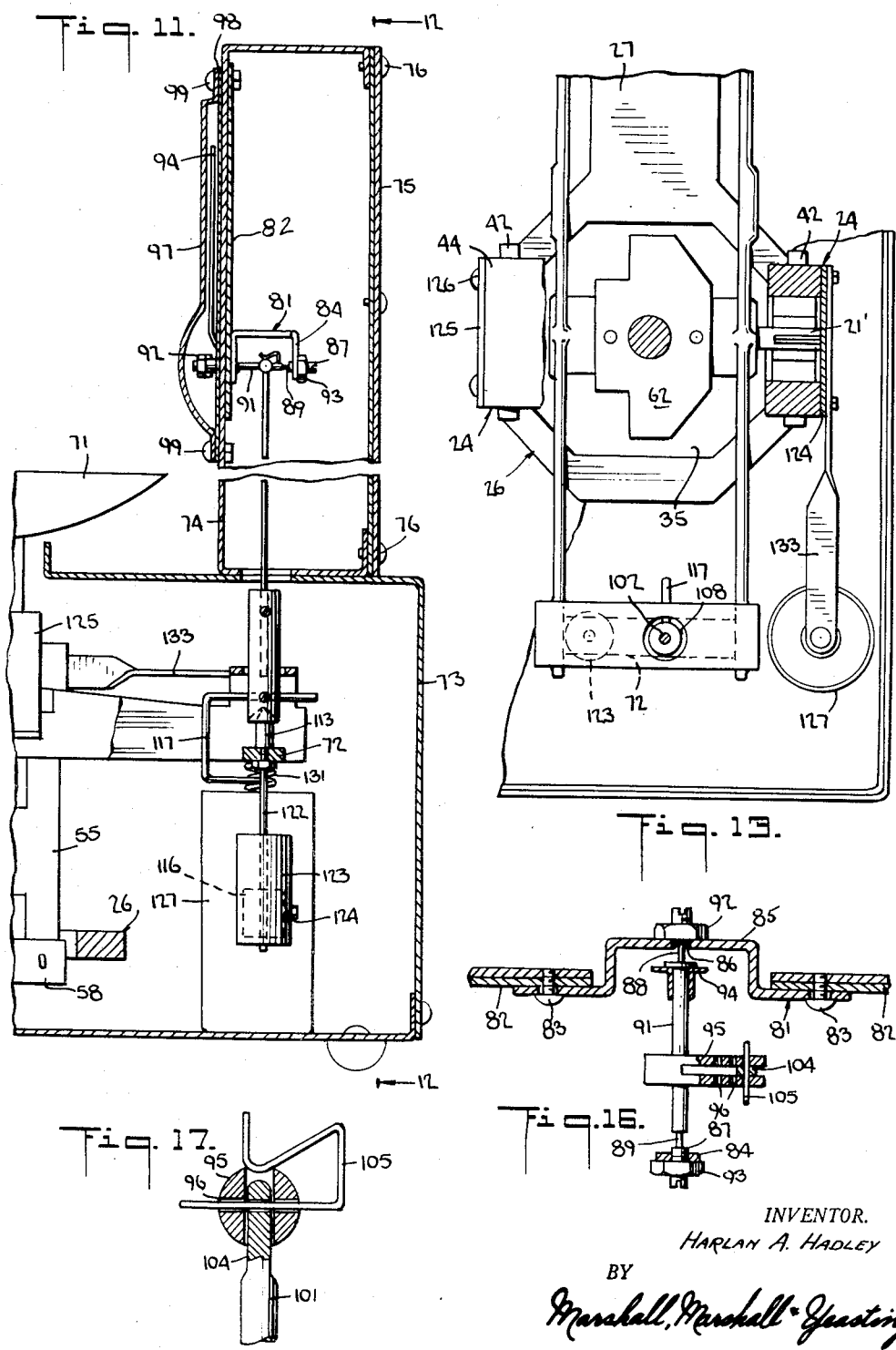

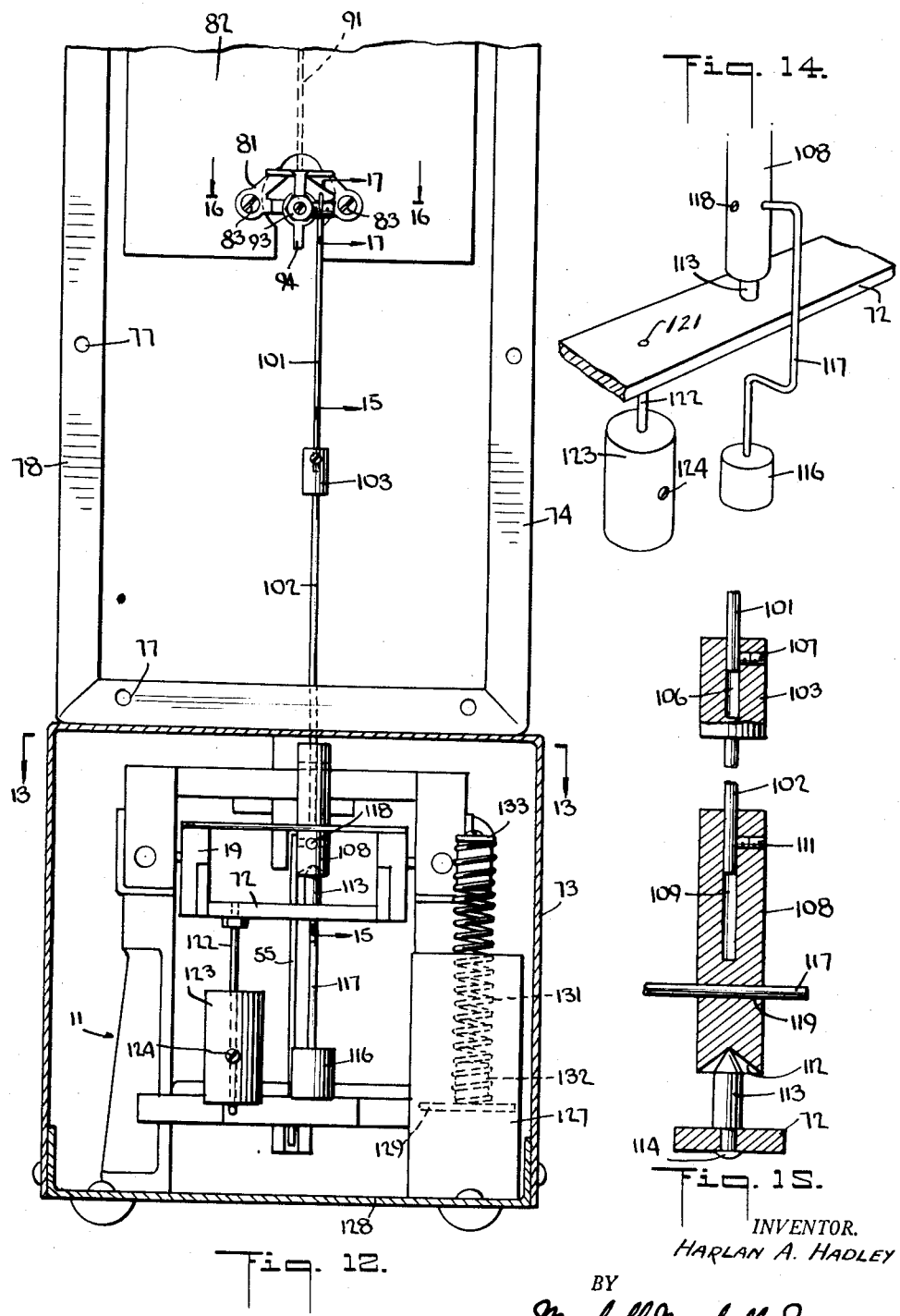

United States Patent Office 2,937,863
Patented May 24, 1960

2,937,863
WEIGHING SCALE

Harlan A. Hadley, Toledo, Ohio, assignor, by mesne assignments, to Toledo Scale Corporation, Toledo, Ohio, a corporation of Ohio Filed Apr. 26, 1957, Ser. No. 655,219

13 Claims. (Cl. 265—54)

This invention relates to weighing scales and more particularly to novel structural features in weighing scales of the type characterized by a lever having a centrally disposed knife-edge pivot supported on a fulcrum stand and having two oppositely extending arms each mounting a knife-edge load pivot equidistant from the fulcrum pivot, whereby great sensitivity and accuracy are attained.

In weighing scales of the type to which the weighing scales of the instant invention belong, it is difficult to prevent wear between the knife edges or pivots and the V-bearings with which the knife edges or pivots cooperate. Another disadvantage of prior weighing scales of this type is the relative ease with which the bearings can be displaced from their original alignments with the knife edges or pivots thus destroying accuracy of the weighing scale.

It is the principal object of this invention to provide a weighing scale which is free from the foregoing and other disadvantages and which will be especially simple and durable in construction and sensitive and accurate in use.

Another object of the invention is to provide a novel bearing construction for cooperating with the knife-edges in such a manner as to permit full contact between knife edges and bearings during motion of the lever even when the knife edges are out of alignment in any plane.

A further object of the invention is the provision of a novel stirrup construction for adjustably connecting a lever and a check link, said stirrup being mounted in such a manner as to permit lateral movement thereof and also to prevent the setting up of undesirable stresses and strains between the upper lever system comprising the main lever and the lower lever system comprising the check link.

Still another object of the invention is to provide novel means for readily adjusting the vertical dimension of the parallelograms formed by the lever arms, the stirrups and the check link.

Another object of the invention is the provision of a novel indicator mechanism supported in neutral equilibrium.

Another object of the invention is to provide a center of gravity weight which may be adjusted for the purpose of distributing the mass of the lever system including the lever and the check link of the weighing scale.

Other objects of the invention, together with certain details of construction and combinations of parts, will appear from the following description and claims.

In the drawings wherein preferred embodiments of the invention are illustrated,

Fig. 1 is a side elevational view of a weighing scale embodying the invention;

Fig. 2 is a top plan view taken along line 2—2 of Fig. 1 in the direction of the arrows;

Fig. 3 is an end elevational view;

Fig. 4 is a cross-sectional view taken along line 4—4 of Fig. 3 in the direction of the arrows, showing the check link construction and the connections of the stirrups thereto;

Fig. 5 is a vertical cross-sectional view taken along line 5—5 of Fig. 1 in the direction of the arrows;

Fig. 6 is a cross-sectional view taken along line 6—6 of Fig. 1 in the direction of the arrows;

Fig. 7 is a view in cross-section taken along line 7—7 of Fig. 6, showing in detail the structure of the stirrup;

Fig. 8 is a cross-sectional view taken along line 8—8 of Fig. 2 in the direction of the arrows showing the means for adjusting the vertical position of the stirrup and the means for holding the same in adjusted position;

Fig. 9 is a cross-sectional view taken along line 9—9 of Fig. 6 in the direction of the arrows, showing a novel bearing structure supported on a load pivot;

Fig. 10 is an exploded view of the novel bearing structure;

Fig. 11 is a side elevational view of the tower end of the scale with the tower and housing of the scale mechanism in cross-section;

Fig. 12 is a sectional view taken along line 12—12 of Fig. 11 in the direction of the arrows;

Fig. 13 is a cross-sectional view taken along line 13—13 of Fig. 12 in the direction of the arrows;

Fig. 14 is a detail view of the counter balancing means for the lever system and the indicator;

Fig. 15 is a cross-sectional view taken along line 15—15 of Fig. 12;

Fig. 16 is a cross-sectional view, on an enlarged scale, taken along line 16—16 in Fig. 12 in the direction of the arrows; and Fig. 17 is a cross-sectional view, on an enlarged scale, taken along line 17—17 of Fig. 12 in the direction of the arrows.

Like reference numerals indicate like parts throughout the several views of the drawings.

Referring now to the drawings, the reference numeral 11 indicates generally a fulcrum stand which comprises two vertical standards 12 and 13 connected by an integral cross-piece 14. The upper extremities of standards 12 and 13 are each provided with a U-shaped seat 15 for the reception of a bearing assembly 16 hereinafter more fully described. The bearing assembly is carried in the seats 15 of the two standards 12 and 13 supporting a knife edge 17 of a fulcrum pivot 18 fixed in a lever 19. Adjacent to the extremities of the lever 19 are fixed load pivots 21 having knife edges 21' which pivots support bearing assemblies 23 and 24, similar to bearing assembly 16. The pivots 18 and 21, as is well known, require exact aligning in order that accurate weighing may be obtained in the use of the weighing scale. To this end, the portion of the pivots between the knife edges are made substantially round and are mounted in the lever 19 in the manner described and claimed in copending application Serial No. 613,513, filed October 2, 1956. Thus, the lever is fixed in a suitable jig which holds it in a horizontal plane. The pivots are then inserted in suitable transverse passageways in said lever and are so held by the jig that they are spaced from the inner walls of the passageways. With the knife edges of the pivots in proper alignment, molten type metal or other suitable material such as a resin, for example, is poured through openings, such as openings 25 shown in Fig. 5, which communicate with the transverse passageways. When the type metal, or the other cementing material, cools and sets, the pivots are rigidly fixed in the lever and the knife edges are permanently aligned in desired position without difficulty and at low cost.

In weighing scales of the type with which the present invention is concerned, there is usually provided a check link arrangement for maintaining the load and counterweight receiving platforms in the desired upright position.

A check link 26 herein employed is substantially the same as that described and claimed in Patent No. 2,692,771. The check link comprises a bar 27 extending longitudinally of the lever 19 and a plurality of steel tapes or bands 28, 29 and 30 fixed to said check link and extending laterally across the longitudinal axis of said bar 27, one of the bands 29 being fixed to the check link by clamping blocks 31 and screw bolts 32, and to fulcrum standards 12 and 13 by means of clamping bars 33 and screw bolts 34. The other bands 28 and 30, extend across openings 35 at the ends of the check link and are fixed to said check link by means of clamps 36 and screw bolts 37.

The bearing assemblies 16, 23 and 24 of the invention are all substantially identical as to structure. As shown particularly in Figs. 9 and 10, each bearing assembly comprises a holder or saddle 38 having integral pairs of bearing posts 39. Each post is provided with an aperture 41 for the reception of a trunnion rod 42 on trunnions 43 on which are pivotally mounted substantially U-shaped cradles 44, the trunnions being received in apertures 45 in the arms 46 of said cradles. The trunnions are held in position in the bearing posts by means of set screws 47 threaded into suitable openings 48 in said bearing posts. The transverse member or base of each of the cradles 44 is provided with an opening 49 which is adapted to receive for free rotation therein the stem 51 of a cylindrical member 52, preferably of a metal such as brass. The cylindrical member is cut away as shown at 53 to form a seat for the reception of an agate V-bearing 54 which is preferably cemented therein.

Important features of the invention are the novel structure and mounting of the stirrups 55 and 56 which operatively connect the bearing assemblies on the load pivots 21 and the check link 26. The stirrups are preferably made of relatively thin metal cut to H-shape and when mounted in the weighing scale have their flat surfaces, i.e., their widest portion, substantially in the vertical plane passing through the horizontal axes of the lever and the check link. The lower legs of the stirrups are attached to the bands 28 and 30 by means of a clamp 57 having an end-bifurcated bar 58, cotter pins 59 passing through suitable apertures in bar 58 and in the lower legs serving to hold the elements together. The upper legs of the H-shaped stirrups are attached to yokes 61. These yokes have a horizontal flat portion 62 and bifurcated depending arms 63 integral with said flat portion, the upper legs of the stirrups being received within the bifurcated arms and are attached thereto by means of cotter pins 64 passing through suitable apertures in the arms and upper legs. The construction and arrangement of the stirrups and connections to the lever and the check link, as outlined above, is such that there is some lateral motion of the stirrups with substantially no vertical motion relative to the lever and check link. However, means are provided to effect vertical adjustment of the stirrups. To this end, the holders or saddles 38 of the bearing assemblies for the load pivots are provided with four threaded holes 65 in threaded engagement with which are four screws 66. The extent to which the screws protrude from the bottom of the holders or saddles 38 determines the height of the stirrups and also determines their vertical position. Screw bolts 67, extending through openings 98 in the holders or saddles 38, cooperate with threaded holes 69 in the flat portion 62 of the yokes to lock the stirrups in adjusted position. Another advantage of the construction hereinbefore set forth is that adjusting the position of the stirrups may be effected readily without the necessity of disassembling the weighing scale. Thus, merely by removing the usual housing and the spiders 70 for the commodity and weight pans 71 the saddles with the adjusting screws are exposed.

In the weighing scale shown in the drawings, the lever 19 is extended at one end, as shown in Figs. 1 and 2 of the drawings, and the extension is provided with an integral bar 72 for the support of an indicating means shown in Figs. 11, 12, 15, 16 and 17. The indicating means is housed partly in the scale lever housing 73 and partly in the end tower 74. The rear of said end tower is normally closed by a door 75 held in position by screws 76 cooperating with suitable screw holes 77 in the frame 78 of the said housing. To counterbalance the indicating elements hereinafter more specifically described, there is carried on the check link 26, at the end of the lever opposite to the indicating means, an adjustable counterweight arrangement generally indicated by reference numeral 79, the opeartion of which counterweight arrangement is well known to those skilled in the art.

The indicating means is an important feature of the invention and comprises a bracket 81 fixed to the rear of the chart 82 by means of screws 83, which chart is secured to the end tower in a manner hereinafter set forth. The bracket 81 is provided with an integral bent portion 84 extending from the front of the bracket beyond the face of chart 82, and an integral depending portion 85. These bent portions 84 and 85 carry jewel bearings 86 and 87, respectively, in which are journaled the reduced ends 88 and 89, respectively, of an indicator shaft 91. Nuts 92 and 93, respectively, hold the bearings 86 and 87 in position on the bracket 81. The indicator shaft 91 has fixed thereto an indicator 94, and a split arm 95 for the purpose hereinafter set forth. The indicator 94 moves across the face of chart 82 as is well known in the art. A cover 97, preferably of transparent plastic material, is placed over the indicator and chart with a gasket 98 between the cover and the end tower, the cover, the gasket and chart being attached to the end tower by any suitable means such as bolts 99.

The indicator 94 is operatively connected to the lever system by extension rods 101 and 102 which are joined by means of a coupler 103 fixed to the lower extension rod 102. The upper extension rod 101 is provided with a reduced end portion 104 which is adapted to be received within the bifurcation of the arm 95 and held therein by means of bent pin 105. The extension rod 101 is connected in holes 96 provided in arm 95 which are spaced at varying distances from the point of rotation of shaft 91. This expedient provides means for varying the sensitivity of the balance over quite a wide range without changing the static balance of the lever system. The overall length of the extension rods 101 and 102 is adjusted by moving rod 101 relative to coupler 103 within the bore 106 therein, the adjusted position being maintained by the use of set screw 107. To the free end of the tower extension rod 102 is fastened a vertically adjustable cylindrical bearing block 108 which receives said extension rod 102 in bore 109 wherein it is held by a set screw 111. The lower extremity of bearing block 108 is provided with a conical depression 112, the apex of which is adapted to rest on the point of a cone-pointed pivot member 113 fixed to the bar 72 on the lever 19 by means of bolt 114 extending through an opening 115 in said bar 72.

To adjust the indicator assembly hereinbefore described so that it is in neutral equilibrium on cone-point pivot 113, there is provided a center-of-gravity weight 116 mounted on a bracket 117 bent to straddle the bar 72, as is shown in Fig. 14. The upper end of the bracket 117 is held by means of a set screw 118 in an opening 119 extending radially through the bearing block 108. To make the proper adjustment, after the bearing block 108 is placed on the pivot 113, the weight 116 is moved along the lower end of bracket 117 until the indicator assembly is in desired neutral equilibrium. Also, if necessary, the upper portion of bracket 117 may be moved relative to bearing block 108 to adjust the center of gravity of the entire indicator assembly so that the extension rods will remain perpendicular and in line with the bifurcation in the arm 95. The indicator assembly makes for the transmission of purer vertical forces without introducing any horizontal components thus keeping the friction at arm 95 to a minimum, and at the same time eliminating any horizontal components that might effect the zero position of the weighing scale when resting in an out of level position.

Another important feature of the invention is the provision of means of adjusting the distribution of mass in the lever system. To this end, there is mounted in a screw-threaded hole 121 in bar 72 a rod 122 on which is supported for vertical movement relative thereto a center-of-gravity weight 123. A set screw 124 is provided for holding the weight in desired position. As is well known, when the lever system including lever 19 and check link 26 is assembled, the common center of gravity lies in a plane passing through knife edge 17 of the fulcrum pivot. Accordingly, the weight 123 provides the necessary adjustment to bring the lever assembly into neutral equilibrium in a vertical plane relative to the fulcrum pivot. When the lever assembly is in neutral equilibrium, the torsion bands in the check link 26 provide the necessary resistance at all times to maintain the lever assembly in fixed relationship to the fulcrum stand 11, thus permitting the weighing scale to set in an out of level position without disturbing the zero balance of the indicator. To maintain the bearing assemblies in position, the saddles 38 as well as the standards 12 and 13 are provided with angular pieces 125 which are attached thereto by means of screws 126.

In Figs. 11, 12 and 13, there is shown means for dampening the vibrations and oscillations of the lever system, which means was omitted from Figs. 1 and 2 in the interest of clarity. There is shown in Figs. 11, 12 and 13 a dashpot construction, such as is described and claimed in Patent No. 2,775,444, but the dashpot construction shown and described in copending application, Serial No. 406,492, filed January 27, 1954, also may be used. The dashpot assembly comprises a cup-shaped body or cylinder 127 which is secured to the bottom plate 128 of lever housing 73. Cooperating with the cylinder 127 is a plunger assembly comprising a plunger disc 129 which may be mounted on any suitable resilient or vibratable element such as a coil spring 131 of any suitable material, which coil spring forms the stem of the plunger assembly. To maintain the disc 129 and the stem 131 together, the disc is provided with an integral lock 132 which fits within and is held by the convolutes of the coil spring 131. The plunger assembly is supported in operative position relative to the cylinder 127 on an arm 133 fixed to one of the angular pieces 125. In the dashpot assembly employed herein the coil spring stem 131 of the plunger assembly is in neutral equilibrium when the weighing scale is in exactly level position. When the weighing mechanism is caused to tip, as by placing the weighing scale on an out of level table or bench, the coil spring stem 131 tends to retain its relationship to its other parts thereby tending to maintain the relative position of the disc 129 within the cylinder with respect to the wall of said cylinder. Accordingly, the edge of the disc will not create excessive friction against the wall of the cylinder no matter how out of level the weighing scale may be, and the introduction of friction into the weighing mechanism by the dashpot is reduced to a minimum.

It is to be understood that the foregoing detailed description is given merely by way of illustration and that many variations may be made therein without departing from the spirit of the invention.

Having described the invention, I claim:

1. In a weighing scale, a member having pairs of bearing posts, a cradle rockably carried by each pair of posts, and a bearing mounted to freely rotate in each of the cradles.

2. A weighing scale comprising, in combination, a fulcrum stand, a lever pivotally mounted on the fulcrum stand, pivots rigidly fixed in the lever one on each side of the fulcrum stand, a pair of bearings for each of the pivots, and a trunioned cradle pivotable about a first axis for supporting each of the bearings, the bearings being mounted to freely rotate in the cradles each about an axis perpendicular to the first axis.

3. A weighing scale comprising, in combination, a fulcrum stand, a lever pivotally mounted on the fulcrum stand, pivots rigidly fixed in the lever one on each side of the fulcrum stand, a member having pairs of bearing posts, there being a member for each of the pivots, a cradle rockably carried by each pair of posts, and a bearing mounted to freely rotate in each of the cradles, the bearings supporting the members on the pivots.

4. A weighing scale comprising, in combination, a fulcrum stand, a lever pivotally mounted on the fulcrum stand, a check link pivotally mounted on the fulcrum stand, a pair of members pivotally mounted on the lever one member on each side of the fulcrum stand, a pair of stirrups, and means for operatively connecting the stirrups to the members and to the check link whereby some lateral motion of the stirrups but substantially no vertical motion of the stirrups relative to the lever and to the check link is permitted, the lever, check link and stirrups forming a parallelogram structure, said means being adjustable to vary the vertical positions of the stirrups relative to the lever to effect adjustment of the vertical dimension of the parallelogram structure.

5. In a weighing scale having a fulcrum stand, a lever pivotally mounted on the fulcrum stand and a check link also pivotally mounted on the fulcrum stand, a pair of stirrups and means for operatively connecting the stirrups to the lever and to the check link whereby some lateral motion of the stirrups but substantially no vertical motion of the stirrups relative to the lever and to the check link is permitted, the stirrups each including a relatively thin flat member having its widest portion substantially in a vertical plane passing through longitudinal axes of the lever and of the check link.

6. A weighing scale comprising, in combination, a fulcrum stand, a lever pivotally mounted on the fulcrum stand, a check link pivotally mounted on the fulcrum stand, a pair of members pivotally mounted on the lever one member on each side of the fulcrum stand, a load receiver attached to each of the members, a pair of stirrups operatively connected to the check link, and means, accessible upon removal of a load receiver, for adjustably mounting one of said stirrups from each of the members, whereby some lateral motion of the stirrups but substantially no vertical motion of the stirrups relative to the lever and to the check link is permitted.

7. A weighing scale comprising, in combination, a pivotally mounted lever, bearing means pivotally supported on the lever, a member pivotally supported on the bearing means, a yoke, means for hanging the yoke from the member, means for adjusting the position of the yoke vertically relative to the member, a stirrup, means for pivotally mounting the stirrup on the yoke, and a pivotally mounted check link that is operatively connected to the stirrup for maintaining the lever and the stirrup in predetermined relationship.

8. A weighing scale, comprising, in combination, a pivotally mounted member, a stationarily mounted chart, an indicator which cooperates with the chart, means for interconnecting the member and the indicator including a pivot on the member, an indicator shaft that is mounted for rotation and that is fixed to the indicator, a crank arm on the shaft and bearing means on the pivot for driving the crank arm, a weight, and means for adjustably suspending the weight from the bearing means to hold the indicator in adjusted neutral equilibrium.

9. A weighing scale according to claim 8 wherein the bearing means on the pivot is connected to the crank arm by a rod and additional means are provided to attach the rod to any one of several points on the crank arm at varying distances from the axis of rotation of the indicator shaft to selectively vary the sensitivity of the scale without changing the static balance of the member.

10. In a weighing scale having a pivotally mounted lever, a pivot on the lever and a stationarily mounted chart, an indicator assembly which cooperates with the chart and which comprises an indicator shaft mounted for rotation, an indicator fixed to the shaft, an arm on the shaft at right angles to the axis of rotation of the shaft, a bearing that is on the pivot and that is operatively connected to a point on the arm, a bracket that is connected to the bearing and that straddles the lever, and a center of gravity weight carried in an adjustable position on the bracket below the lever, the weight being so located that the indicator assembly is in adjusted neutral equilibrium.

11. A weighing scale according to claim 10 wherein means are provided to move the bracket relative to the bearing for selectively adjusting the center of gravity of the indicator assembly.

12. A weighing scale comprising, in combination, a fulcrum stand, a main lever pivotally mounted on the fulcrum stand, a check lever pivotally mounted on the fulcrum stand, a pair of members pivotally mounted on the main lever one member on each side of the fulcrum stand, a pair of coupling means, and connecting means for operatively connecting the coupling means to the members and to the check lever whereby some lateral motion of the coupling means but substantially no vertical motion of the coupling means relative to the levers is permitted, the levers and coupling means forming a parallelogram structure, said connecting means being adjustable to vary the vertical position of each of the coupling means relative to the respective member to which it is connected to effect adjustment of the vertical dimension of the parallelogram structure.

13. A weighing scale comprising, in combination, a fulcrum stand, a main lever pivotally mounted on the fulcrum stand, a check lever pivotally mounted on the fulcrum stand, a pair of members pivotally mounted on the main lever one member on each side of the fulcrum stand, a load receiver attached to each of the members, a pair of coupling means operatively connected to the check lever, means, accessible upon removal of one of the load receivers, for adjustably mounting one of said coupling means from one of the members, and means, accessible upon removal of the other one of the load receivers, for adjustably mounting the other one of the coupling means from the other one of the members, whereby some lateral motion of the coupling means but substantially no vertical motion of the coupling means relative to the levers is permitted.

References Cited in the file of this patent

UNITED STATES PATENTS

| | | |
|---|---|---|
| 1,478,123 | Hurt | Dec. 18, 1923 |
| 1,706,977 | Hurt | Mar. 26, 1929 |
| 2,090,288 | Eschenbacher et al. | Aug. 17, 1937 |
| 2,244,587 | Williams | June 3, 1941 |
| 2,381,268 | Eastman | Aug. 7, 1945 |
| 2,405,497 | Goodman | Aug. 6, 1946 |
| 2,502,776 | Burdick | Apr. 4, 1950 |
| 2,582,517 | Williams | Jan. 15, 1952 |
| 2,771,289 | Hadley | Nov. 20, 1956 |